United States Patent [19]
Elliott et al.

[11] 3,835,202
[45] Sept. 10, 1974

[54] TRITHIOPYROPHOSPHATES

[75] Inventors: John Scotchford Elliott; Gerald John Joseph Jayne; Patrick James Folliard, all of London, England

[73] Assignee: Edwin Cooper & Company Limited, London, England

[22] Filed: May 11, 1972

[21] Appl. No.: 252,254

[30] Foreign Application Priority Data
May 12, 1971 Great Britain.................... 14496/71

[52] U.S. Cl.................. 260/933, 252/46.6, 260/988
[51] Int. Cl........................... C07f 9/16, C10m 1/48
[58] Field of Search............................ 260/988, 933

[56] References Cited
UNITED STATES PATENTS
2,342,431  2/1944  Smith et al...................... 260/933 X
3,654,170  4/1972  Woodson........................ 260/988 X Primary Examiner—Anton H. Sutto
Attorney, Agent, or Firm—Bacon & Thomas

[57] ABSTRACT

A process for preparing a trithiopyrophosphate or mixture thereof of the general formula:

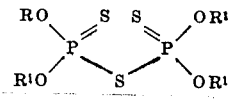

wherein R is a primary alkyl group and each $R^1$ is the same or different and is a primary alkyl group, an aryl group, an alkaryl group or an aralkyl group, comprises heating a dithiophosphoric acid at a temperature of at least 120°C. until the acid value has fallen to a level of from 10 to 70 mg.KOH/g. and thereafter neutralising the reaction mixture. Also described are lubricating compositions containing the trithiopyrophosphates as antioxidants and load-carrying additives.

8 Claims, No Drawings

TRITHIOPYROPHOSPHATES

This invention relates to lubricant additives and particularly to the preparation of phosphorus compounds useful for this purpose. More particularly the invention relates to the preparation of trithiopyrophosphates.

For many years zinc dialkyl dithiophosphates have been used in lubricants as antioxidants and load carrying agents. However, the conditions under which such lubricants are used have in many cases changed as improved engines have been developed. As a result it has been found that zinc dialkyl dithiophosphates are in some respects undesirable, in particular in respect of ash content, and interest has therefore been generated in ashless additives. In particular trithiopyrophosphates have been found to be a very useful alternative.

Several methods of preparing trithiopyrophosphates have been proposed but each method has suffered from one or more disadvantages. The simplest, and most economic, method has been the heating of a dithiophosphoric acid to form a trithiopyrophosphate. For example, di-m-tolyldithiophosphoric acid has been heated to form tetra-m-tolyltrithiopyrophosphate. However, this method, although adequate for aryl trithiopyrophosphates, is not suitable for alkyl trithiopyrophosphates. When dialkyldithiophosphoric acids are heated part of the reactant initially forms a tetralkyl trithiopyrophosphate but as the reaction proceeds to completion thermal decomposition takes place to yield a product unsuitable for use as a lubricant additive.

According to the present invention, there is provided a process for preparing a trithiopyrophosphate or mixture thereof of the general formula:

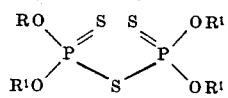

wherein R is a primary alkyl group, preferably containing 3 to 24, more preferably 3 to 16 carbon atoms, and each $R^1$ is the same or different and is a primary alkyl group, an aryl group, an alkaryl group or an aralkyl group and wherein the aromatic nucleus in the aryl, alkaryl or aralkyl groups may be substituted by one or more halogen atoms or alkoxy groups, which process comprises heating at least one dithiophosphoric acid at a temperature of at least 120°C., preferably from 120°C. to 180°C., more preferably 150°C. to 170°C., until the acid value, as hereinafter defined, has fallen to a level of from 10 to 70 mg.KOH/g. and thereafter neutralising the reaction mixture. Preferably all $R^1$ groups are primary alkyl.

The selection of one or more appropriate dithiophosphoric acids for making a specific product according to the process of the present invention will be evident from the general formula described above.

The dithiophosphoric acid employed in the process of the present invention may be an 0,0'-dialkyl-dithiophosphoric acid. In this case the two alkyl groups may be the same or different. Alternatively the dithiophosphoric acid may be an 0,0'-alkyl/aryl-, 0,0'-alkyl/alkaryl- or 0,0'-alkyl/aralkyl-dithiophosphoric acid, that is, an acid in which one of the organic groups attached to the oxygen atoms in an alkyl group and the other group is an aryl, alkaryl or aralkyl group respectively. In another alternative the dithiophosphoric acid may be a mixture of one, or more, 0,0'-dialkyl-, 0,0'-alkyl/aryl-, 0,0'-alkyl/alkaryl- or 0,0'-alkyl/aralkyl-dithiophosphoric acids with one, or more, 0,0'-dialkyl-, 0,0'-alkyl/aryl-, 0,0'-alkyl/alkaryl-, 0,0'-alkyl/aralkyl-, 0,0'-diaryl-, 0,0'-dialkaryl-, 0,0'-diaralkyl-, 0,0'-aryl/alkaryl-, 0,0'-aryl/aralkyl- or 0,0'-alkaryl/aralkyl dithiophosphoric acids. The aromatic nucleus in an aryl, alkaryl or aralkyl group in the dithiophosphoric acid may be substituted by one or more halogen atoms or alkoxy groups.

The term "acid value" employed herein refers to the value, in mg.KOH/g, as measured by the method which comprises neutralising a solvent comprising 50 parts benzene and 50 parts Industrial Methylated Spirits to lacmoid indicator, dissolving the reaction product in the neutralised solvents and titrating the solution with KOH until the lacmoid end point is reached.

The process of the present invention may be carried out in the presence of an inert solvent, e.g. xylene, toluene or mineral oil, particularly mineral oil of lubricating viscosity. It is preferably carried out in the absence of solvent, or in the presence of mineral oil solvent.

The acid value at which the process of the present invention is terminated is preferably from 25 to 70 mg. KOH/g. It is especially preferred for the reaction to be carried out until the acid value has fallen to a value of from 30 to 45 or 50 mg.KOH/g. The acid value is preferably monitored by periodic determinations, the frequency increasing as the acid value approaches 70mg.KOH/g. At this point there may be some slight deposition of decomposition products but this will not significantly affect the course of the preparation. The level to which the acid value is permitted to fall within the range 10 to 70 mg.KOH/g. is preferably varied according to the reactants chosen. For example, using diisobutyl dithiophosphoric acid as the starting material it is possible to permit the acid value to fall as low as 10mg.KOH/g. However, with diprimary alkyl dithiophosphoric acids having larger alkyl groups it is highly desirable that the acid value is only permitted to fall to a level higher than 10mg.KOH/g. e.g., 30 to 50mg.KOH/g.

After formation of the trithiopyrophosphate the reaction product is neutralised in accordance with the present invention. Neutralisation can be carried out with any base. For example, the reaction product can be neutralised with a metal oxide or hydroxide, for example magnesium oxide. This provides an additive of low ash content. Alternatively, ammonia or an amine may be used to give an ashless additive. However, it is preferred to dissolve the product in an inert solvent, particularly a low boiling solvent such as petroleum ether, and neutralise it with aqueous caustic soda or caustic potash or moist sodium carbonate, thereafter drying over MgSO$_4$. Neutralisation in this manner yields an additive of acceptable low sodium or potassium content. Alternatively, the product can be dissolved in a mineral oil, washed with alkali and thereafter dried to yield an oil concentrate of the additive.

While aqueous caustic soda or caustic potash is the preferred neutralisation medium for lower alkyl trithiopyrophosphates it has been found that its use with longer chain trithiopyrophosphates may result in emulsification of the product. It is therefore preferred to use moist sodium carbonate to neutralise the longer chain trithiopyrophosphates.

This additive may be treated with Fuller's Earth or activated charcoal to reduce the sodium content even further, optionally before filtration and/or stripping.

The dithiophosphoric acid starting materials of the present invention may be obtained by reaction of primary alcohols and/or phenols with phosphorus pentasulphide in a molar ratio of 4:1. If desired the dithiophosphoric acids may be generated in situ at a temperature of, for example, 60°C. to 90°C. and the temperature then increased to form the trithiopyrophosphates.

It is to be understood that the present invention also includes trithiopyrophosphates when prepared by the process of the invention, such products being useful as antioxidants, e.g. in lubricants, paints, plastics materials and functional fluids such as hydraulic fluids, in which they may be employed in amounts of, for example, 0.1 to 10 percent by weight. In lubricants the products are also useful as load-carrying additives. The products may also be useful as agricultural chemicals. The present invention therefore includes a lubricating composition containing a major amount of lubricating oil and a minor amount, for example, from 0.1 to 10 percent, preferably from 0.5 to 5 percent by weight based on the total weight of the lubricating composition, of a product prepared by the process of the present invention.

The lubricating oil used may be a mineral lubricating oil, synthetic hydrocarbon oil or synthetic esters of well known types such as, for example di-(2-ethylhexyl) sebacate or trimethylol propane or pentaerythritol esters of straight chain aliphatic acids containing from 4 to 9 carbon atoms.

It is to be understood that lubricating compositions containing compounds prepared according to the process of the present invention may also contain conventional lubricating composition additives such as one or more additional antioxidants, corrosion inhibitors, detergents, dispersants, viscosity index improvers, antiwear additives, extreme pressure additives or any combination thereof.

Suitable additional antioxidants are phenothiazine, optionally substituted on one or both benzene nuclei and/or the nitrogen atom, a hindered phenol or a hindered bis-phenol or a secondary amine having two aromatic nuclei attached to the nitrogen atom. In one aspect of the invention the additional antioxidant is a secondary amine having two aromatic nuclei attached to the nitrogen atom, in which one or both of the aromatic nuclei bear one or more alkyl groups, particularly alkyl groups containing from 4 to 12, more preferably 8 or 9, carbon atoms. Examples of such amines are mono-octyl phenyl-α-naphthylamines and mono-octyl phenyl-β-naphthylamines, particularly N-p-t-octyl phenyl-α-naphthylamine and N-p-t-octyl phenyl-β-naphthylamine; and mono-nonyl phenyl-α-naphthylamines and mono-nonyl phenyl-β-naphthylamines. Other amines are diphenylamine and mono- or di-alkyl diphenylamines, particular examples being di-octyl and di-nonyl diphenylamines, especially the p,p' isomers. These secondary amines may be used in an amount of 0.1 to 10 percent by weight, preferably 0.2 to 5 percent by weight.

Suitable corrosion inhibitors include benzotriazole or a derivative thereof, an aliphatic carboxylic acid, a dicarboxylic acid, for example, dodecenyl succinic acid, mercaptobenzothiazole and benzothiazole disulphide.

Suitable detergents include an alkaline earth metal petroleum or alkyl benzene sulphonate, carboxylate, salicylate or naphthenate, any of which may be overbased with an alkaline earth metal carbonate. Other suitable detergents, which may also be overbased, include a phosphosulphurised hydrocarbon and an alkyl phenol which has been neutralised by an alkaline earth metal base.

A suitable dispersant is a long chain hydrocarbon substituted by a polyamine group attached thereto either directly or through an amide or imide link, as described in British Pat. Specification Nos. 1,068,235 and 1,121,641.

A typical viscosity index improver which may be used in this invention is a copolymer of a mixture of monomers, which monomers are esters of acrylic or methacrylic acid. Other unsaturated monomers such as N-vinyl pyrrolidone, diethylaminoethyl methacrylate or fumaric acid may be included in the mixture to give viscosity index improvers having dispersant properties.

Synthetic esters which may be employed as the lubricating oil and conventional additives which may be included in lubricating compositions are described in British Patent Specification No. 1,205,177.

The process of the present invention will now be illustrated with reference to the following examples:

EXAMPLE I

Stage A 888g (12m) isobutanol was stirred in a glass vessel under nitrogen with refluxing and 666 g (3m) $P_2S_5$ added in aliquot portions while maintaining the temperature of the reaction at 75°C. After 16 hours the equivalent weight of the reaction product was found to be 247 as measured by titration against KOH in 50:50 benzene/Industrial Methylated Spirits using phenolphthalein indicator. 1102g of a clear olive green liquid was obtained.

Stage B 50g (0.2m) of the product of Stage A were maintained at a temperature of 165°C. – 170°C. for 2½ hours by which time the acid value had fallen to 35 mg.KOH/g.. The product was dissolved in an approximately equal volume of petroleum ether (B.Pt.40°–60°C.), washed four times with a total of 100 ml NaOH solution (containing 20g NaOH) and then washed with four 50 ml portions of water. After separation the aqueous layer was decanted and the organic layer dried with anhydrous $MgSO_4$. After filtration the solvent was stripped off.

Final yield was 33g (66%).

Analysis:
Found    21.46%S    13.53%P
Calc.    21.39%S    13.78%P

EXAMPLE II 300g (0.78m) of 0,0'-di-2-ethylhexyl dithiophosphoric acid were maintained at a temperature of 165°C. for 7 hours, by which time the acid value had fallen to 41 mg.KOH/g.. The product was then treated with approximately 100g. $Na_2CO_3$ moistened with approximately 20 mls. of water and the treated product filtered three times to yield 207.5g (73%) of a light green liquid.

Analysis:

Found 14.8%S 8.17%P
Calc. 14.3%S 9.2%P

EXAMPLE III 75g. (0.15m) of 0,0'-di-tridecyl dithiophosphoric acid were heated at 165°C. for 1 hour, at which time the orange-coloured reaction mixture had an acid value of 55. The reaction mixture was dissolved in 50 ml pwtroleum ether (B.Pt.40°–60°C.) and shaken with approximately 20g. $Na_2CO_3$ moistened with approximately 4 mls. of water. The resulting colourless solution was filtered and stripped to yield 61g (85 percent) of the product.

Anaylsis:
Found 10.93%S 5.34%P
Calc. 10.01%S 6.49%P

EXAMPLE IV

Cetyl alcohol (77g. 0.32m) and $P_2S_5$ (17.66g. 0.08m) were stirred for 1½ hours under nitrogen, the temperature being maintained below 100°C, to produce 0,0'-di-cetyl dithiophosphoric acid. The acid so produced was heated at 180°C for 2½ hours, by which time the acid value had fallen to 25mg.KOH/g. The product was dissolved in toluene, treated with wet sodium carbonate, filtered, dried over $MgSO_4$ and the solvent stripped off to yield 83g. of a dark liquid (acid value 9mg.KOH/g.) which solidified after a few days.

Analysis:
Found 11.0%S 4.4%P
Calc. 8.56%S 5.53%P

EXAMPLE V

The equivalent weight of 0,0'-di-isobutyl dithiophosphoric acid, prepared in a similar manner as in Stage A of Example I, was determined as 282. A quantity of this acid (70.5g., 0.25m.) was mixed with 0,0'-di-nonylphenyl dithiophosphoric acid (134g., 0.25m.) and the mixture heated to 160°C for one hour. The reaction temperature was raised to 170°C for a further 2 hours and then raised to 180°C for a further 11¼ hours, during which the acid value fell as follows:

|  | Acid Value (mg.KOH/g.) |
| --- | --- |
| Initial | 127 |
| After 1 hour at 160°C | 127 |
| After 2 hours at 170°C | 112 |
| After 1 hour at 180°C | 62 |
| After 2½ hours at 180°C | 41 |
| After 6 hours at 180°C | 24 |
| After 11¼ hours at 180°C | 14 |

The product was dissolved in petroleum ether (B.Pt.61°–68°C), stirred with moist sodium carbonate, filtered, washed with water, dried over $MgSO_4$, stripped and refiltered to yield 166.1g. (89.5 percent) of viscous amber liquid (acid value 5 mg.KOH/g).

Analysis:
Found 12.7%S 8.55%P
Calc. 12.9%S 8.35%P

EXAMPLE VI

A mixed isobutyl/nonylphenol dithiophosphoric acid was prepared by heating together nonylphenol (220g., 1.0m.) and isobutanol (74g. 1.0m.) at 90-95°C and adding a total of 111g. (0.5m.) of $P_2S_5$ thereto in portions. Heating was maintained for 2½ days, the temperature being raised to 95°–100°C towards the end of this period, and the resulting dithiophosphoric acid was filtered. A quantity (320g.) of the resulting acid was heated at 170°C for one hour, the temperature then raised to 180°C for 11½ hours and then raised again to 190°C for a further 2 hours. The acid value fell as follows:

|  | Acid Value (Mg.KOH/g.) |
| --- | --- |
| Initial | 96 |
| After 1 hour at 170°C | 97 |
| After 1 hour at 180°C | 43 |
| After 2½ hours at 180°C | 29 |
| After 7 hours at 180°C | 28 |
| After 11½ hours at 180°C | 27 |
| After ½ hour at 190°C | 24 |
| After 1½ hours at 190°C | 24 |

The final product was washed with saturated aqueous $Na_2CO_3$ to yield 197g. (63.9%) of a viscous, amber liquid (acid value 3mg.KOH/g.)

Analysis:
Found 12.4%S 8.43%P
Calc. 12.9%S 8.35%P

EXAMPLE VII p-Methoxy phenol (124g. 1m.) and $P_2S_5$ (55.5g. 0.25m.) were stirred together at 130°C under nitrogen for 1½ hours to produce 0,0'-di-p-methoxyphenyl dithiophosphoric acid of equivalent weight 351 (theory 342). A mixture of the 0,0'-di-p-methoxyphenyl dithiophosphoric acid (70.2g. 0.2m.) and 0,0'-di-isobutyl dithiophosphoric acid (54.4g.0.2m.) was heated at 170°C under nitrogen for 1½ hours and the temperature raised to 190°C for a further 8½ hours (during which a large volume of liquid was distilled off). The acid value fell as follows:

|  | Acid Value (mg.KOH/g.) |
| --- | --- |
| Initial | 171 |
| After 1½ hours at 170°C | 151 |
| After 1 hour at 190°C | 103 |
| After 3 hours at 190°C | 51 |
| After 5½ hours at 190°C | 22 |
| After 8½ hours at 190°C | 47 |

The product was dissolved in toluene, treated with moist sodium carbonate, filtered, dried over $MgSO_4$ and the solvent stripped off to yield 76.5g. (69.5 percent) of a very viscous, amber liquid (acid value 22mg.KOH/g.).

Analysis:
Found 17.0%S 11.27%P
Calc. 17.0%S 11.20%P

EXAMPLE VIII p-Chlorophenol (128.5g. 1.0m.) and $P_2S_5$ (55.5g. 0.25m.) were stirred together at 130°C under nitrogen for one hour and the product filtered to produce 0,0'-di-p-chlorophenyl dithiophosphoric acid of equivalent weight 353 (theory 351). A mixture of the 0,0'-di-p-chlorophenyl dithiophosphoric acid (88.25g. 0.25m.) and 0,0'-di-isobutyl dithiophosphoric acid was heated at 180°C under nitrogen for 9¼ hours, the acid value falling as follows:

| | Acid Value (mg.KOH/g.) |
|---|---|
| Initial | 153 |
| After 1¼ hours at 180°C | 55 |
| After 3 hours at 180°C | 38 |
| After 5½ hours at 180°C | 25 |
| After 9¼ hours at 180°C | 24 |

The product was dissolved in petroleum ether and toluene, stirred with moist sodium carbonate, filtered, dried over MgSO₄, stripped and refiltered to yield 92g. (65.8 percent) of the final product (acid value 8.9mg.KOH/g.).
Analysis:
  Found   16.78%S   11.01%P
  Calc.   17.17%S   11.09%P

We claim:

1. A process for preparing a trithiopyrophosphate or mixture thereof of the general formula:

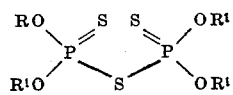

wherein R is a primary alkyl group and each R¹ is the same or different and is selected from the group consisting of primary alkyl, phenyl and alkyl, alkoxy or halogen substituted phenyl, which process comprises heating at least one dithiophosphoric acid having 0,0' substituents as defined above at a temperature of from about 120°C to 180°C, until the acid value has fallen to a level of from 10 to 70 mg. KOH/g. and thereafter neutralising the reaction mixture with a base selected from the group consisting of metal oxides, hydroxides and carbonates, ammonia and amines.

2. A product comprising the neutralized reaction mixture prepared by the process according to claim 1.

3. A process according to claim 1 wherein R contains from 3 to 16 carbon atoms.

4. A process according to claim 1 wherein all R¹ groups are primary alkyl groups.

5. A process according to claim 1 wherein the dithiophosphoric acid is heated at a temperature of from 150°C to 170°C.

6. A process according to claim 1 wherein the heating is continued until the acid value has fallen to a value of from 30 to 50 mg.KOH/g.

7. A process according to claim 1 wherein the reaction is carried out in the presence of an inert solvent.

8. A process according to claim 1 wherein
  a. the dithiophosphoric acid is heated at a temperature of from 120°C to 180°C until
  b. the acid value has fallen to a value of from 25 to 70 mg.KOH/g.

* * * * *